United States Patent [19]
Bilbow

[11] 3,741,416
[45] June 26, 1973

[54] FOAM HANDLING APPARATUS AND METHOD

[75] Inventor: Patrick J. Bilbow, Wilkes-Barre, Pa.

[73] Assignee: Lyn-Weld Co., Inc., Wilkes-Barre, Pa.

[22] Filed: Dec. 21, 1970

[21] Appl. No.: 99,790

[52] U.S. Cl................ 214/152, 53/24, 53/124 B, 100/35, 100/278, 214/83.3
[51] Int. Cl.............................................. B60p 3/00
[58] Field of Search................ 214/152; 100/35, 100/278; 53/24, 124 B

[56] References Cited
UNITED STATES PATENTS

| 3,537,390 | 11/1970 | Hinkel | 53/124 B X |
|---|---|---|---|
| 3,557,683 | 1/1971 | Boyd | 53/124 B X |
| 3,541,752 | 11/1970 | Ness | 53/24 |
| 3,499,261 | 3/1970 | Hullhorst et al. | 53/24 |

Primary Examiner—Albert J. Makay
Attorney—Seidel, Gonda & Goldhammer

[57] ABSTRACT

Foam buns are compressed for storage and/or shipment to reduce the volume of the buns. A power operated platen is disposed between adjacent buns to equalize the compression. Compression of the buns preferably takes place in the body of an over-the-road vehicle.

7 Claims, 11 Drawing Figures

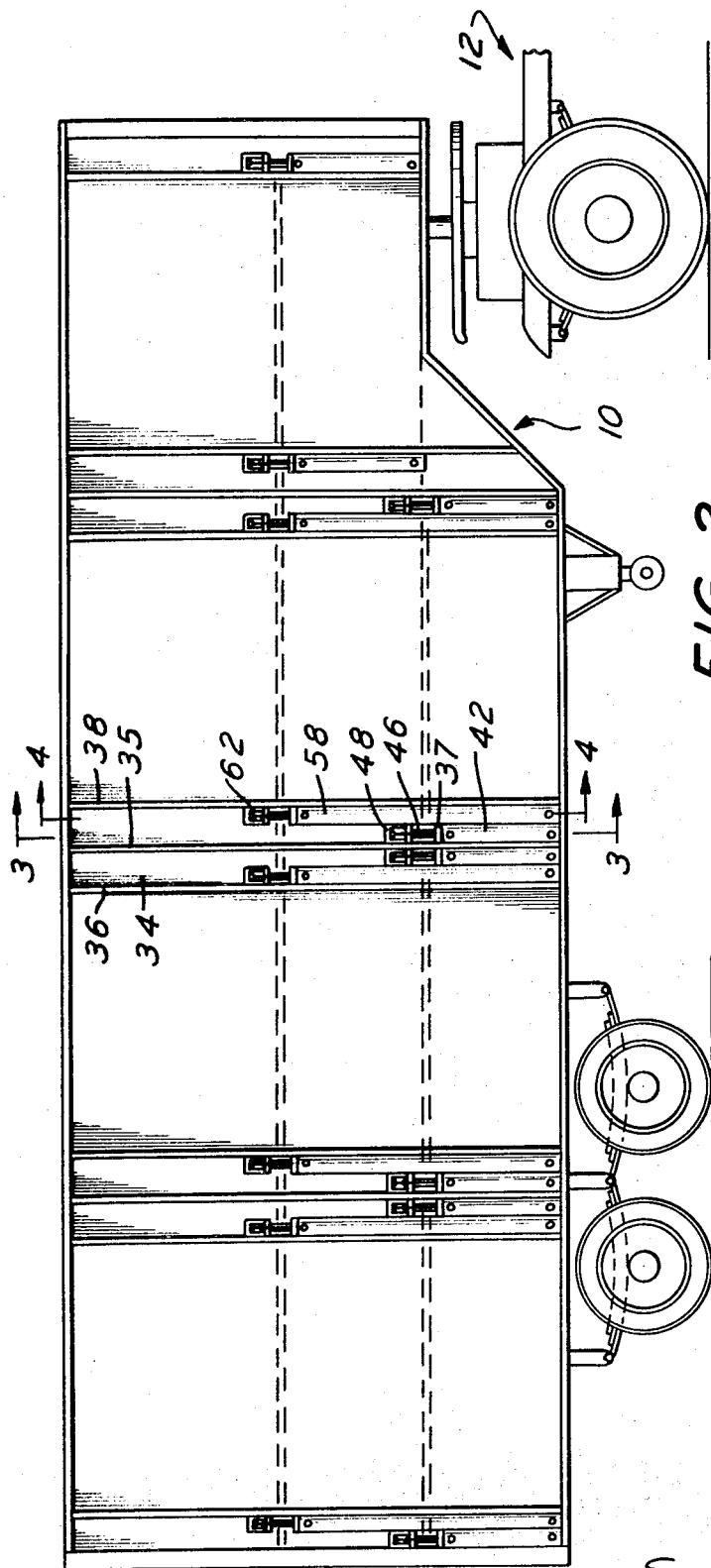
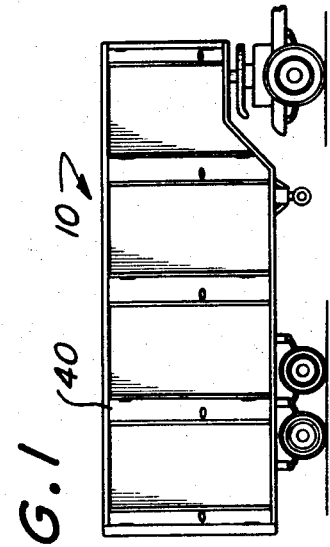
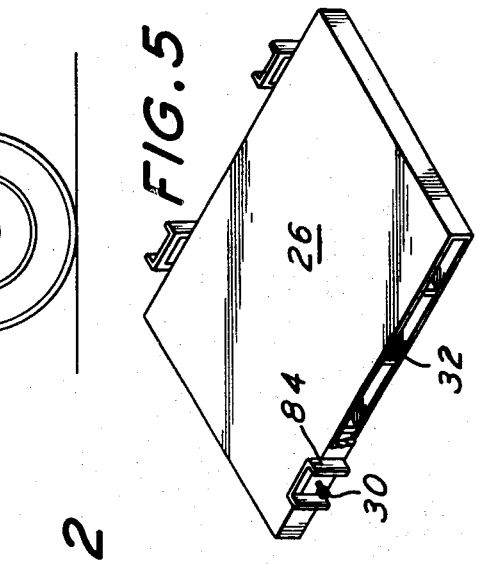
INVENTOR
PATRICK J. BILBOW
BY
Seidel, Gonda & Goldhammer
ATTORNEYS

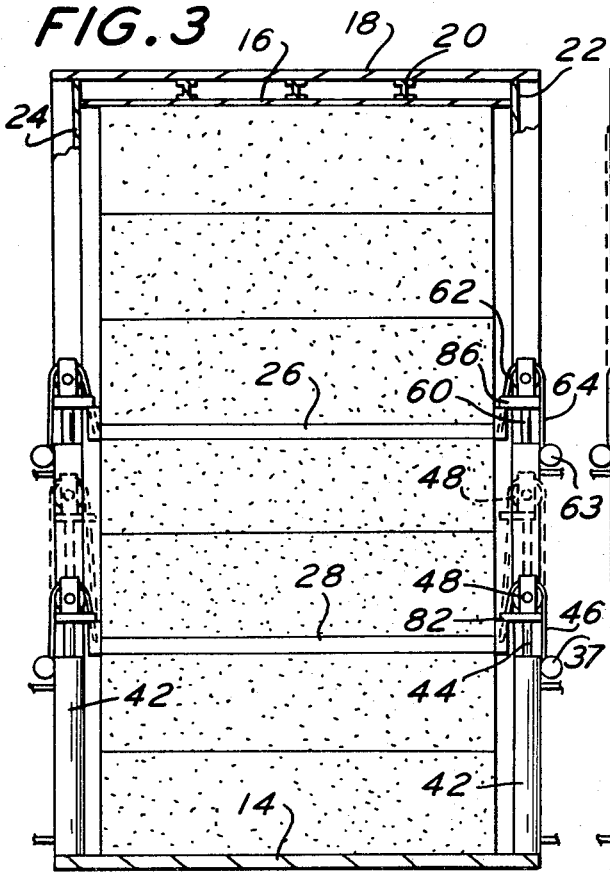
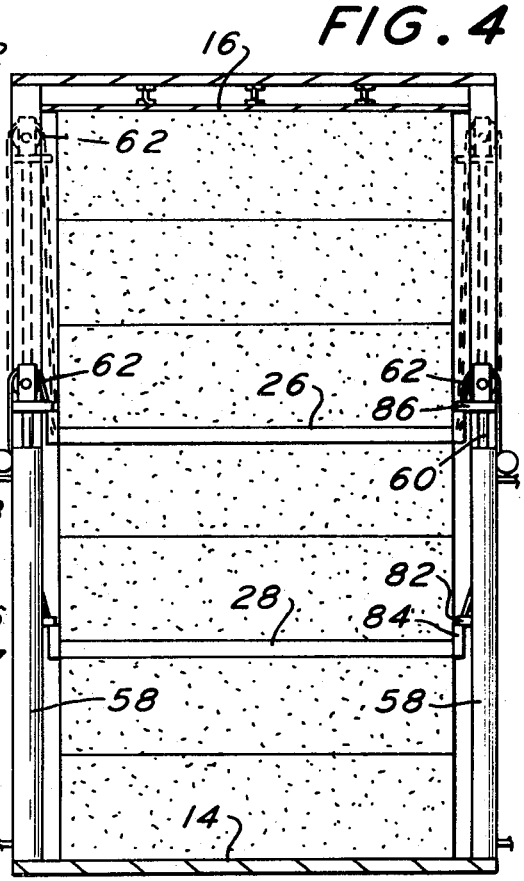
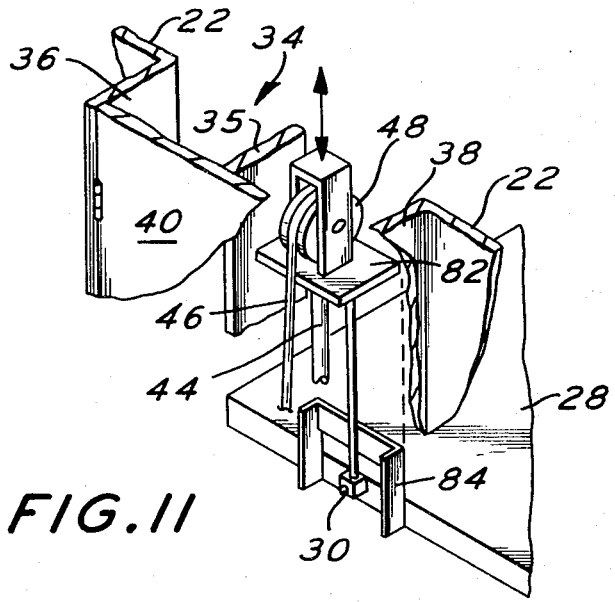
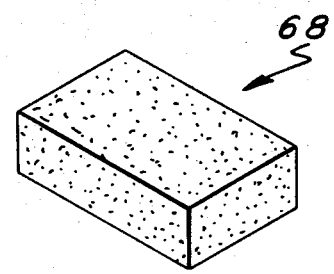

INVENTOR
PATRICK J. BILBOW
BY
Seidel, Gonda, i Goldhammer
ATTORNEYS

FOAM HANDLING APPARATUS AND METHOD

This invention is directed to apparatus and method for handling foam buns such as sponge, foam rubber, foam polymeric plastics, etc. Foam polymeric plastics are conventionally made in the shape of buns which are 10 feet long, 7 feet wide, and 3 feet thick. Shipment of such buns to processors has been a problem for many years due to the volume occupied by the buns. In a typical forty foot trailer body, eight such buns in an uncompressed state would be shipped. The present invention enables the same trailer body to accommodate between twenty and thirty such buns in a compressed state.

I have found that it is not sufficient to merely stack a large number of buns one on top of the other and then compress all of the buns simultaneously. I have found that when buns are compressed in this manner, there is a wide divergence between the state of compression of the buns whereby the lowermost bun will only be compressed 30 percent whereas the uppermost bun will be compressed 85 percent. This wide divergence of compression can be significant in connection with polyurethane foams wherein the percent of recover after decompression is a function of the amount of compression and the duration of compression. Hence, it is desirable that the amount of compression of each bun be substantially the same.

In order to substantially equalize the amount of compression on the buns, a power operated platen is disposed between adjacent buns. I have found that with a stack of five or six buns of the size referred to hereinafter, the provision of a platen between the second and third buns may be utilized to reduce the difference between the most compressed and the least compressed bun to only five percent. When more than six buns which are each about 36 inches high, are stacked one above the other, I prefer to use two such platens.

The method and apparatus of the present invention does not require any special loading facilities whereby the buns can be loaded or unloaded from standard truck docks and shelters. The buns are preferably compressed in a body of an over-the-road vehicle such as a semitrailer body. The vehicle body is provided with stationary reaction surface, one at the floor and one at the ceiling. At least one movable platen is provided for movement from a position adjacent the floor and capable of moving upwardly through a distance of at least half the distance between the reaction surfaces. The power for moving the platen or platens may be located in the side walls of the vehicle body or any other convenient location. The power for effecting movement of the platens can be provided in a variety of forms, but preferably in the form of piston cylinder arrangements coupled to the platen by flexible members such as cables or chains.

In accordance with the method of the present invention, first and second foam buns are compressed while the buns are moved in a first direction such as upwardly. Thereafter, third and fourth buns are positioned in the location formerly occupied by the first and second buns. Thereafter, the third and fourth buns are partially compressed while the first and second buns are decompressed until there is a substantial equalization in the amount of compression of all buns. When foam buns are handled in accordance with the present invention, the handling capacity may be triple that which was attained heretofore while at the same time not interfering with the commercial acceptance or quality of the buns.

It is an object of the present invention to provide a novel method and apparatus for handling foam buns.

It is another object of the present invention to provide a method of shipping foam buns in a manner whereby the number of buns which may be shipped is substantially increased over that attainable heretofore without interfering with the quality or acceptance of the buns.

It is another object of the present invention to provide a novel vehicle body for shipping and/or storing foam buns in a manner whereby the number of buns capable of being handled is substantially increased.

It is another object of the present invention to provide apparatus and method for handling foam buns which do not require special loading facilities or special loading docks.

It is another object of the present invention to provide apparatus and method for compressing and decompressing foam buns in a manner whereby the amount of compression of the buns will be substantially equal.

It is another object of the present invention to provide method and apparatus for handling foam buns in a manner which is simple, economical, and reliable.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a side elevation view of a vehicle body utilized to transport buns in accordance with the present invention.

FIG. 2 is a view similar to FIG. 1 but on an enlarged scale and with portions removed to illustrate interior structure.

FIG. 3 is a sectional view taken along the line 3—3 in FIG. 2.

FIG. 4 is a sectional view taken along the line 4—4 in FIG. 2.

FIG. 5 is a perspective view of a platen shown in FIGS. 3 and 4.

FIG. 10 is a perspective view of a foam bun capable of being handled by the present invention.

FIG. 11 is a partial perspective view of a platen and its actuator means.

Figure 6:
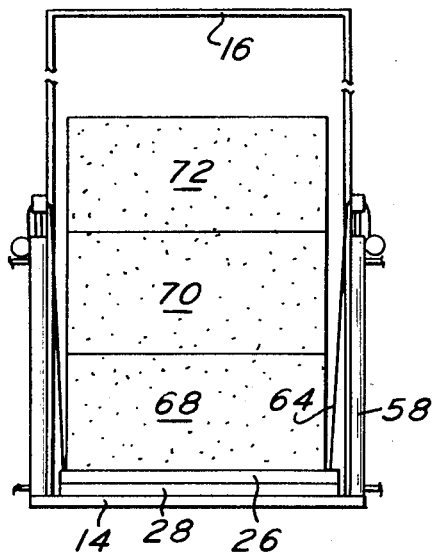
FIGS. 6–9 are diagrammatic illustrations showing the sequential handling of foam buns within the vehicle body shown in FIG. 2.
Figure 7:
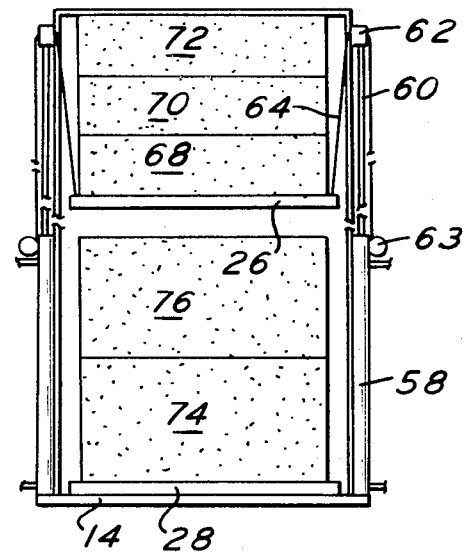
Figure 8:
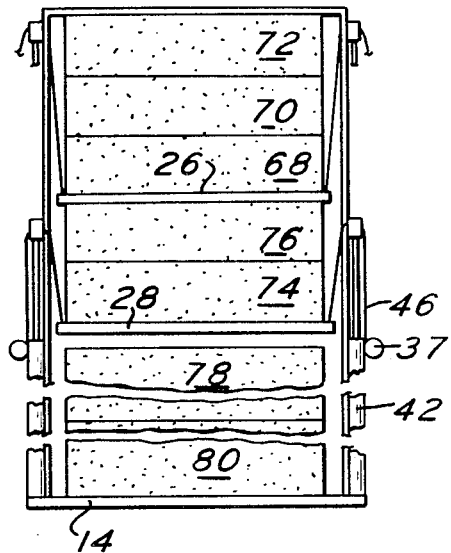
Figure 9:
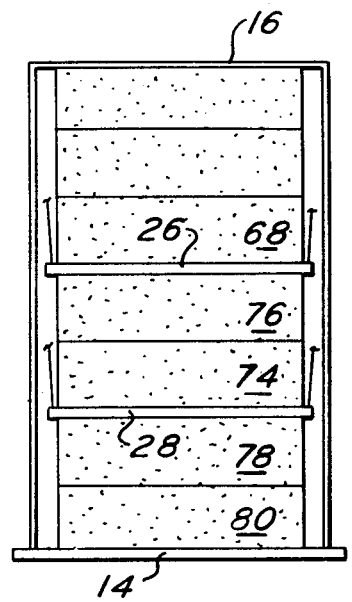

Referring to the drawing in detail, wherein like numerals indicate like elements, there is shown in FIGS. 1 and 2 the body of an over-the-road vehicle such as a semitrailer 10 coupled to a tractor 12. The semitrailer 10 is conventional except as will be made clear hereinafter. Hence, it is not deemed necessary to discuss the bogies, brake systems and other conventional features of a semitrailer.

The body 10 of the semitrailer or other vehicle includes a reaction surface 14 which may be in the floor of the body and a reaction surface 16 adjacent the top or roof skin 18. Reinforcement beams 20 may be provided between the reaction surface 16 and the skin 18. The body 10 is also provided with side walls 22 and 24.

The body 10 is provided with a plurality of sets of foam bun compression and decompression means serially located therealong. In a forty-foot trailer body, four such compression and decompression means are provided. Since all such compression and decompression means are identical, only one will be described in detail, namely the third such unit from the rear end of the body 10.

As shown more clearly in FIGS. 3, 4 and 6, a first platen 26 overlies a second plate 28 which in turn overlies the first reaction surface of the floor 14. In order to accommodate buns which are ten feet long and seven feet wide, the distance between the side walls 22 and 24 is slightly in excess of seven feet and hence within the conventional range of widths for semitrailers. The side edges of the platens 26 and 28 extend parallel to the side walls 22 and 24 of the body 10.

The platens 26 and 28 are identical. In FIG. 5, there is illustrated a perspective view of platen 26. Platen 26 is comprised of top and bottom skins connected together by internal reinforcement 32 of the egg crate type. A pin 30 terminating in a removable head extends outwardly from the side walls of the platen 26. There are four such pins 30 on the platen 26 with each pin being spaced from the adjacent end of the platen 26 by a distance of .21 times the length of the platen 26, or 2.1 feet from the adjacent end of a ten foot platen. This placement of the pins 30 provides for negative droop in the center and at the ends of the platen.

At spaced points along the length of the side walls of the body 10, there are provided compartments 34 which communicate directly with the interior of body 10 and having a vertical divider wall 35. Each compartment 34 is defined at its sides by vertical channels 36 and 38. See FIG. 2. Each compartment 34 is closed on one side by means of an access door 40. See FIG. 1. The access doors have been removed in the illustration shown in FIG. 2. The doors 40 form a part of the side walls 22 and 24.

Within the compartments 34, there is provided a stationary cylinder 42 having a piston rod 44 extending from the top end. A cable 46 has one end connected to a spring wound storage drum 37 on the cylinder 42 and has its other end connected to a pin 30 on platen 28. The intermediate portion of cable 46 extends around a pulley 48 at the upper end of piston rod 44.

As piston rod 44 moves up and down by the introduction of a motive fluid such as oil or air into cylinder 42, platen 28 may apply pressure upwardly or downwardly.

In compartment 34, and adjacent to cylinder 42, there is provided a cylinder 58. Cylinder 58 is an extensible or telescoping cylinder containing a piston rod 60. Piston rod 60 is provided with a pulley 62 at its upper end. One end of a cable 64 is connected to a spring wound storage drum 63 on a stationary portion of cylinder 58. The other end of cable 64 is connected to a pin 30 on platen 26. An intermediate portion of the cable 64 extends around the pulley 62.

In FIG. 10, there is illustrated a typical bun of foam material designated by the numeral 68. Depending upon the number of platens used and the number of buns to be compressed and disposed one above the other for purposes of shipment and/or storage, the buns 68 may be under a state of compression ranging from 28 to 60 percent of their original height.

In the diagrammatic illustration set forth in FIGS. 6-9, additional buns, identical with bun 68 are identified by the numerals 70-80. Before any of the buns are loaded in the body 10, the platens 26 and 28 are in the position shown in FIG. 6. Buns 68-72, in an uncompressed state, are stacked one on top of the other as shown in FIG. 6. Thereafter, motive fluid introduced into cylinder 58 causes the platen 26 to move upwardly from the position shown in FIG. 6 to the position shown in FIG. 7. This movement compresses the buns 68-72 against the reaction surface 16 until they are each approximately 15 percent of their original height or compressed to a state of 85 percent.

Thereafter, the buns 74 and 76 are positioned on platen below platen 26. See FIG. 7. Thereafter, any suitable device may be utilized to cause the platen 26 to move downwardly to compress buns 74 and 76 and simultaneously decompress buns 68-72 until they all attain a compression of approximately 28-34 percent. Alternatively, platen 28 may be caused to move upwardly from the position shown in FIG. 7 to the position shown in FIG. 8. Thus, as platen 28 moves upwardly it compresses buns 74 and 76 against the platen 26 and provides sufficient space therebelow for additional buns 79 and 80. Thereafter, motive fluid may be introduced into cylinder 42 to cause platen 28 to move downwardly to compress buns 78 and 80 against the reaction surface 14 while simultaneously permitting platen 26 to descend so that buns 68-74 may decompress. In this manner, each of the buns will then be permitted to assume a state of compression which is substantially equal.

The manner in which the platens 26 and 28 are suspended avoids negative droop at the center ends of the platens whereby the state of compression over the surface area of the buns is substantially equal. Foam polymeric buns such as foam polyurethane are compressible when subjected to a force of approximately 2-½ psi. Since the forces for compressing the buns are applied by way of four cylinders connected to pins adjacent the four corners of each platen, the pressures involved in the motive fluid are minimized.

The hydraulic circuitry including conduits and valves for introducing motive fluid into the various cylinders is conventional and therefore need not be described in detail. On a drop center semitrailer as shown at the righthand end of the body 10 in FIG. 2, a fewer number of buns are capable of being handled as compared with the three remaining sections of the body 10. It will be noted in connection with the above that the buns are supported on a major face thereof as opposed to being supported on a side. When supported on a side or end, the buns tend to deform and do not have the same recovery properties as compared to storage and shipment of the buns on a major face. A typical bun 68 of the dimensions referred to above has a weight of approximately 200-250 pounds when comprised of foam polyurethane. Unless the pressures on the buns are substantially equal, a permanent set of up to two inches may result, thereby affecting the commercial quality and acceptance of the bun.

Any one of a variety of devices such as piston-cylinders, constant pressure spring, etc. may be used to apply positive downward pressure on platen 28 to compress buns 78 and 80. I prefer to accomplish this object by attaching an arm member 82 to each piston rod 44. After piston rod 44 has moved downwardly a sufficient distance, the arm members 82 engage an upwardly extending bracket 84 on the side face of platen 28 and force platen 28 downwardly. The pins 30 are between the legs of the brackets 84.

Platen 26 is preferably moved downwardly in the same manner as platen 28. Hence, platen 26 is also provided with brackets 84 and cooperable arm members 86 are attached to the piston rods 60. This invention is not limited for use only with buns of the size referred to above but can be used with other types of buns such as pillows, cushions, mattresses, etc. The storage drums 37 and 62 are intended to take up slack in the cables 46 and 64 respectively. If desired, the storage drums may be eliminated. While cables are preferably used, other flexible members such as chains may be used.

The present invention may be embodied in other specific forms without departing from the spirit or essential attributes thereof and, accordingly, reference should be made to the appended claims, rather than to the foregoing specification as indicating the scope of the invention.

I claim:

1. A method of handling buns of compressible material comprising the steps of compressing first and second buns while moving the buns in a first direction by a platen, positioning third and fourth buns in the location formerly occupied by the first and second buns and on an opposite side of the platen with respect to the first and second buns, and then compressing the third and fourth buns while partially decompressing the first and second buns to substantially equalize the amount of compression of all buns, said step of compressing the third and fourth buns including moving the platen in a direction opposite to the first direction.

2. A method in accordance with claim 1 wherein said step of compressing the first and second buns includes compressing foam buns so that the buns are less than one-half their original thickness.

3. A method in accordance with claim 1 wherein the buns are of a geometric shape having generally planar upper and lower surfaces, and transporting the buns while the buns are subjected to a substantially equal amount of compression.

4. A method in accordance with claim 1 wherein said step of moving the buns in a first direction includes moving the buns upwardly, and said step of partially decompressing the first and second buns includes allowing the buns to expand downwardly.

5. A method in accordance with claim 1 including performing the compressing and decompressing steps of the buns while the buns are disposed within a body of an over-the-road trailer.

6. A method of handling foam buns comprising the steps of compressing first and second buns of foam polymeric material by moving the buns upwardly, positioning third and fourth buns in the space formerly occupied by the first and second buns, compressing the third and fourth buns upwardly, positioning a fifth bun in the space formerly occupied by the above-mentioned buns, and compressing the fifth bun downwardly while permitting the remaining buns to decompress so that all buns are compressed to substantially the same amount.

7. A method in accordance with claim 6 including performing the compressing and decompressing steps within the body of an over-the-road vehicle.

* * * * *